(12) United States Patent
Koseki et al.

(10) Patent No.: US 11,323,058 B2
(45) Date of Patent: May 3, 2022

(54) DRIVE CONTROLLER FOR ELECTRIC MOTOR

(71) Applicant: HITACHI ASTEMO, LTD., Hitachinaka (JP)

(72) Inventors: Tomonobu Koseki, Hitachinaka (JP); Mamoru Ogura, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/433,047

(22) PCT Filed: Mar. 4, 2020

(86) PCT No.: PCT/JP2020/009141
§ 371 (c)(1),
(2) Date: Aug. 23, 2021

(87) PCT Pub. No.: WO2020/179818
PCT Pub. Date: Sep. 10, 2020

(65) Prior Publication Data
US 2022/0045642 A1  Feb. 10, 2022

(30) Foreign Application Priority Data

Mar. 4, 2019  (JP) .............................. JP2019-038345

(51) Int. Cl.
*H02H 3/04* (2006.01)
*H02H 7/08* (2006.01)
(Continued)

(52) U.S. Cl.
CPC ........ *H02P 27/08* (2013.01); *H02M 7/53871* (2013.01); *H02P 25/16* (2013.01); *B62D 5/0463* (2013.01)

(58) Field of Classification Search
CPC ...... H02P 27/08; H02P 25/16; H02M 7/53871
(Continued)

(56) References Cited

U.S. PATENT DOCUMENTS

2003/0137850 A1   7/2003  Liaw et al.
2003/0137858 A1   7/2003  Tsuji et al.
(Continued)

FOREIGN PATENT DOCUMENTS

JP      2003-219657 A   7/2003
JP      2017-169405 A   9/2017
(Continued)

OTHER PUBLICATIONS

International Search Report dated Apr. 7, 2020 issued in International Application No. PCT/JP2020/009141, with English translation, 5 pages.
(Continued)

*Primary Examiner* — Erick D Glass
(74) *Attorney, Agent, or Firm* — Foley & Lardner LLP

(57) ABSTRACT

The drive controller for the electric motor according to the present invention comprises two drive control systems for two winding sets of the electric motor, each drive control system includes a control circuit, an inverter, a power supply connector and a ground connector, the two control circuits are connected to an internal common ground, each rectifying element that passes a current from the common ground to each ground connector is provided in a line that connects the ground connector and the common ground, each current detection element is provided in a line that connects each positive power supply and a line between the rectifying element and the ground connector, and whether an open fault has occurred in the ground connector is diagnosed based on the voltage that is applied to the current detection element.

7 Claims, 4 Drawing Sheets

(51) Int. Cl.
    *H02P 27/08*     (2006.01)
    *H02P 25/16*     (2006.01)
    *H02M 7/5387*    (2007.01)
    *B62D 5/04*      (2006.01)

(58) Field of Classification Search
    USPC .......................................................... 318/490
    See application file for complete search history.

(56)          References Cited

U.S. PATENT DOCUMENTS

2017/0272009 A1    9/2017  Kawamura et al.
    2017/0291640 A1*  10/2017  Fujita ................. B62D 15/0235
    2018/0154930 A1*   6/2018  Rice .......................... H02P 5/51
    2019/0152524 A1*   5/2019  Fujita ..................... B62D 5/046
    2020/0313590 A1*  10/2020  Otake ..................... H02P 25/22

FOREIGN PATENT DOCUMENTS

JP         2018-042403  A     3/2018
    JP         2018-182962  A    11/2018

OTHER PUBLICATIONS

Written Opinion of the International Searching Authority dated Apr. 7, 2020 issued in International Application No. PCT/JP2020/009141, with English translation, 9 pages.
International Preliminary Report on Patentability dated Sep. 16, 2021 issued in International Application No. PCT/JP2020/009141, with English translation, 11 pages.

* cited by examiner

DRIVE CONTROLLER FOR ELECTRIC MOTOR

TECHNICAL FIELD

The present invention relates to a drive controller for use in an electric motor that includes a first winding set and a second winding set.

BACKGROUND ART

A motor control device of Patent Document 1 has two electronic control unit (ECU) systems each including a microcomputer that is provided in combination with a drive circuit. Each ECU is connected to each external power supply, and includes a constant voltage circuit. The constant voltage circuit in each ECU adjusts the voltage from the external power supply to a constant value, and supplies such voltage to the microcomputer as an operating voltage.

Here, the low potential side of the drive circuit and the low potential side of the external power supply are connected to each other by a power supply ground line in each ECU, and the power supply ground line and the low potential side of the drive circuit are connected to each other to an internal ground in each ECU.

The microcomputers in each ECU include an abnormality detection unit. The abnormality detection unit detects an abnormality of the ground on the basis of the ground voltage of the internal ground which is obtained with reference to the operating voltage of the ECU to which the abnormality detection unit belongs.

REFERENCE DOCUMENT LIST

Patent Document

Patent Document 1: JP2018-042403A

SUMMARY OF THE INVENTION

Problem to be Solved by the Invention

Meanwhile, if the internal ground of the control circuit is used in common between the systems, a current flowing through an inverter of the first system may flow into the ground connector of the second system via the common internal ground when an open abnormality occurs in the ground connector of the first system.

Since the current flowing through the inverter of the second system also flows into the ground connector of the second system, if the energization control for the inverter of the first system continues as usual even though the open abnormality occurs in the ground connector of the first system, the ground connector of the second system overheats due to the continuous flow of the current that exceeds the current capacity, and consequently, abnormalities may occur successively.

Here, if the abnormality in the ground connector can be detected, countermeasures can be taken before the abnormalities occur successively.

The present invention has been accomplished in view of the conventional circumstances, and accordingly, it is an object of the present invention to provide a drive controller for an electric motor that is capable of detecting whether an abnormality has occurred in a ground connector.

Means for Solving the Problem

According to an aspect of the present invention, a drive controller for an electric motor includes systems in which a control circuit in each system is connected to an internal common ground, a rectifying element that passes a current from the common ground to a ground connector is provided in a line that connects the ground connector and the common ground in each system, and a current detection element is provided in a line that connects a positive power supply and a line between the rectifying element and the ground connector and in each system.

Effects of the Invention

According to the present invention, whether an abnormality has occurred in a ground connector can be detected, and a series of abnormalities in the ground connector can be prevented from occurring.

MODE FOR CARRYING OUT THE INVENTION

Hereinafter, an embodiment of the present invention will be described in detail with reference to the attached drawings.

Hereinafter, an example of an electric power steering device for a vehicle that adopts the drive controller for the electric motor according to an aspect of the present invention is illustrated.

Figure 1:
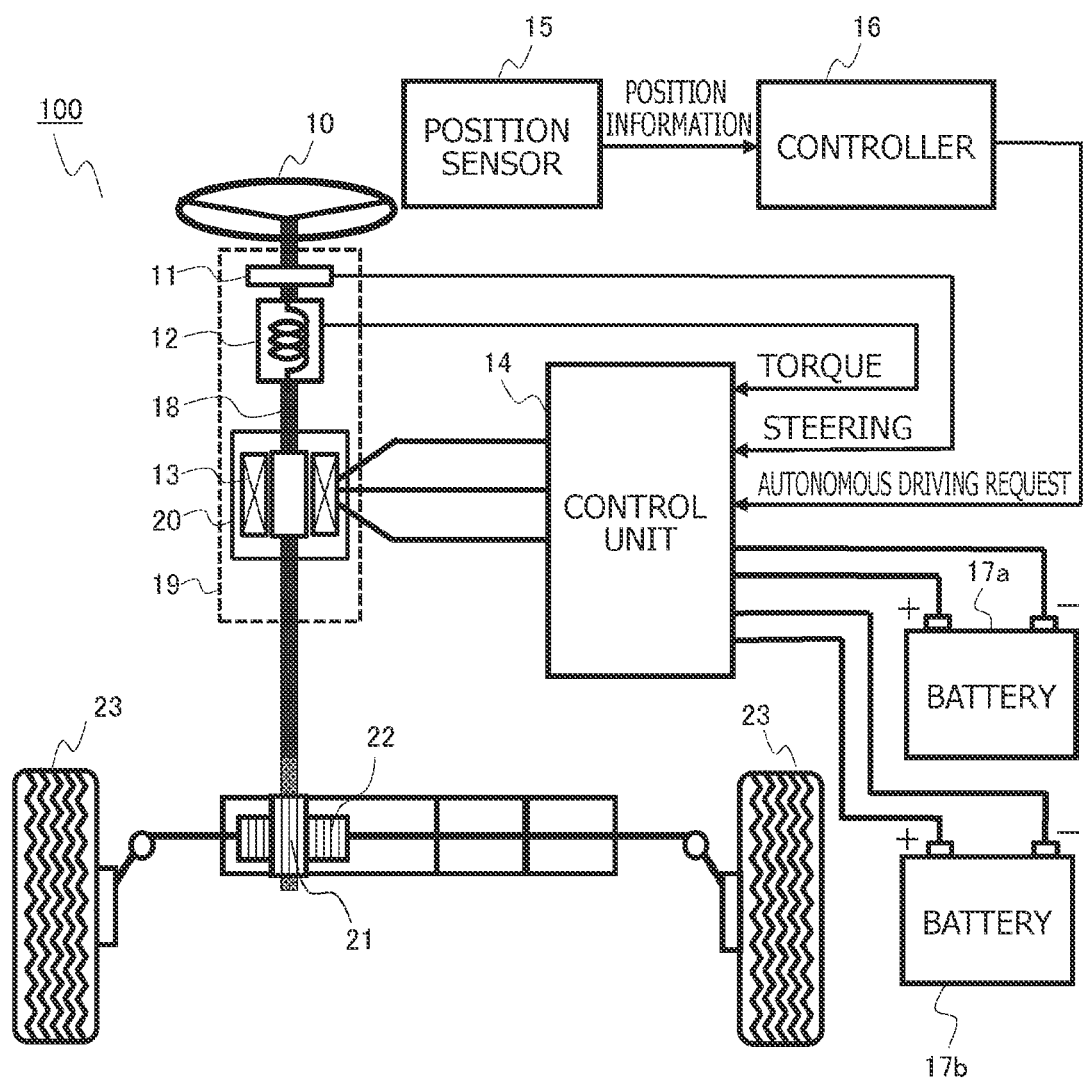
FIG. 1 is a schematic diagram of an electric power steering device.

FIG. 1 illustrates a schematic diagram of an electric power steering device 100.

Electric power steering device 100 includes a steering wheel 10, a steering angle sensor 11, a steering torque sensor 12, an electric motor 13, an EPS control unit 14, a vehicle position detection sensor 15, an autonomous driving controller 16, batteries 17a and 17b and the like.

A steering column 19 that accommodates a steering shaft 18 includes steering angle sensor 11, steering torque sensor 12, electric motor 13 and a reducer 20.

The driving force of electric motor 13 is transmitted to steering shaft 18 via reducer 20 to rotate steering shaft 18.

The tip end of steering shaft 18 includes a pinion gear 21. Along with the rotation of pinion gear 21, a rack shaft 22 is horizontally moved to the left or right as viewed in the travel direction to give a steering angle to turning wheels 23 and 23.

When a driver steers the vehicle, EPS control unit 14 controls and drives electric motor 13 based on the detection value of the steering torque by steering torque sensor 12, information of the vehicle speed and the like so as to generate the steering assist force.

On the other hand, in a case of autonomous driving, autonomous driving controller 16 obtains the steering angle command based on position information and the like that is acquired from vehicle position detection sensor 15. Then, EPS control unit 14 acquires the autonomous driving request and steering angle command from autonomous driving controller 16, and controls and drives electric motor 13 to bring the actual steering angle closer to the steering angle command.

Figure 2:
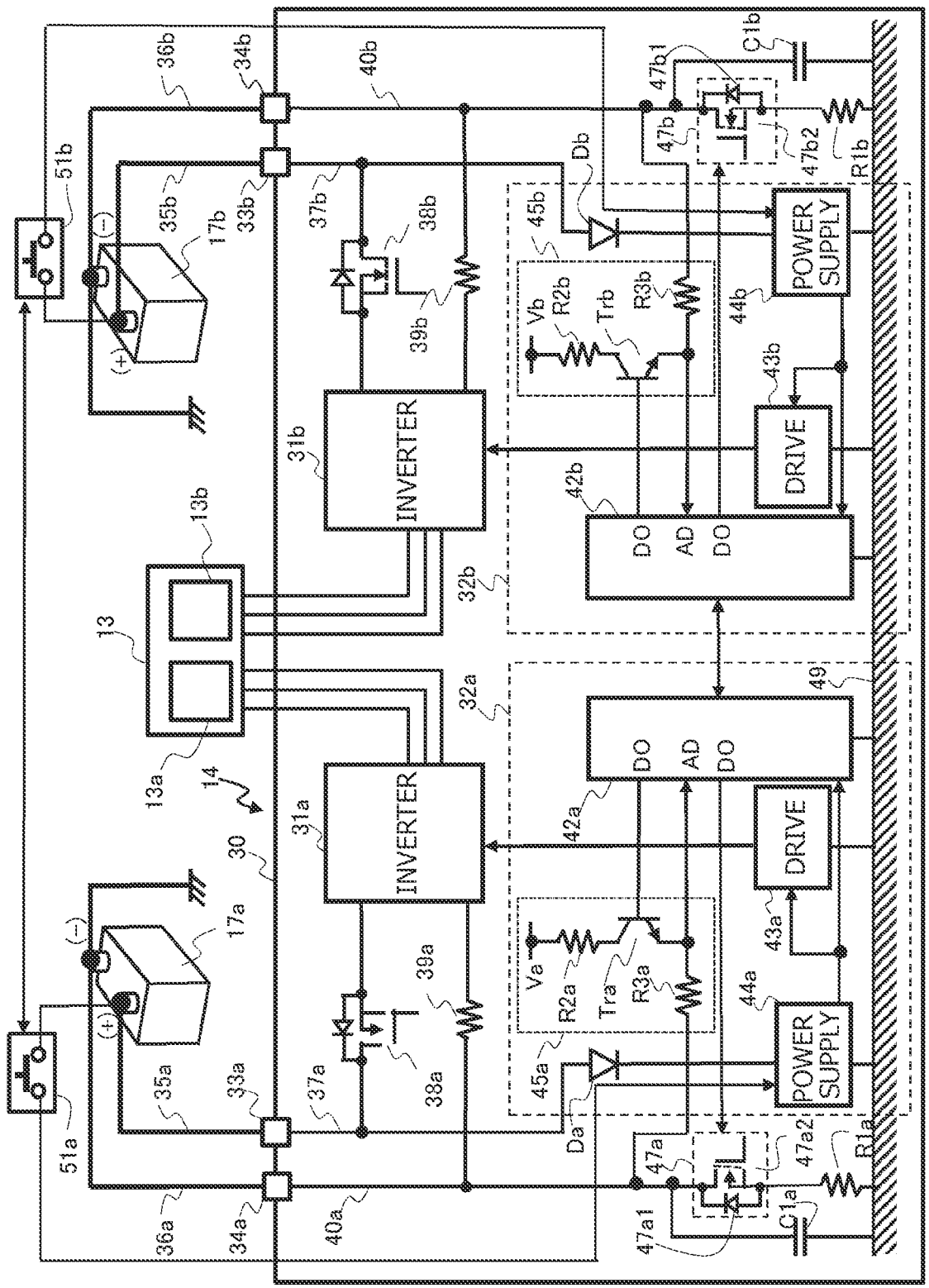
FIG. 2 is a circuit diagram of a drive controller for an electric motor.

FIG. 2 illustrates a circuit structure of EPS control unit 14 which is the drive controller for electric motor 13. Note that FIG. 2 illustrates the main parts that are related to supplying power to EPS control unit 14 and related to controlling and driving electric motor 13.

Electric motor 13 is, for example, a three-phase synchronous electric motor that has a first winding set 13*a* and a second winding set 13*b*, each of which consisting of a U-phase coil, a V-phase coil, and a W-phase coil.

EPS control unit 14 has two drive control systems that control and drive winding sets 13*a* and 13*b* individually, and the drive control systems include control circuits 32*a* and 32*b*, inverters 31*a* and 31*b*, power supply connectors 33*a* and 33*b*, ground connectors 34*a* and 34*b*, and the like.

Hereinafter, each drive control system of EPS control unit 14 will be described in detail.

A housing 30 of EPS control unit 14 houses first inverter 31*a*, second inverter 31*b*, first control circuit 32*a*, second control circuit 32*b*, and the like.

First inverter 31*a* and first control circuit 32*a* constitute the first drive control system (i.e., the first system) that controls and drives first winding set 13*a*, and second inverter 31*b* and second control circuit 32*b* constitute the second drive control system (i.e., the second system) that controls and drives second winding set 13*b*.

First control circuit 32*a* has a first microcomputer 42*a*, a first drive circuit 43*a*, a first power supply circuit 44*a*, and the like, and second control circuit 32*b* includes a second microcomputer 42*b*, a second drive circuit 43*b*, a second power supply circuit 44*b*, and the like.

First microcomputer 42*a* and second microcomputer 42*b* each includes a central processing unit (CPU), a read-only memory (ROM), a random-access memory (RAM), and the like.

Furthermore, housing 30 includes first power supply connector 33*a*, first ground connector 34*a*, second power supply connector 33*b*, and second ground connector 34*b* for connecting external batteries 17*a* and 17*b* with the internal electric circuits.

A pair of first power supply connector 33*a* and first ground connector 34*a* supplies power from first battery 17*a* to the first drive control system, and a pair of second power supply connector 33*b* and second ground connector 34*b* supplies power from second battery 17*b* to the second drive control system.

First power supply connector 33*a* is connected to the positive terminal (i.e., the positive electrode) of first battery 17*a* via a first power supply harness 35*a*, and first ground connector 34*a* is connected to the negative terminal (i.e., the negative electrode) of first battery 17*a* via a first ground harness 36*a*.

Second power supply connector 33*b* is connected to the positive terminal of second battery 17*b* via a second power supply harness 35*b*, and second ground connector 34*b* is connected to the negative terminal of second battery 17*b* via a second ground harness 36*b*.

First power supply connector 33*a* is connected to first control circuit 32*a* via a power supply line 37*a* in housing 30.

The power supply terminal of first inverter 31*a* is connected to power supply line 37*a*. Also, a power supply relay 38*a* which is the fifth switch element for controlling supplying and cutting off power from first battery 17*a* to first inverter 31*a* is arranged between power supply line 37*a* and first inverter 31*a*.

Power supply relay 38*a* is composed of an N-channel MOSFET, for example, and first microcomputer 42*a* of first control circuit 32*a* outputs the control signal (i.e., the command signal) to power supply relay 38*a* to switch power supply relay 38*a* on and off.

The parasitic diode (i.e., the internal diode or body diode) of the N-channel MOSFET that constitutes power supply relay 38*a* has its cathode connected to power supply line 37*a* and its anode connected to first inverter 31*a*.

Furthermore, first ground connector 34*a* is connected to a common ground 49 via a ground line 40*a*. Common ground 49 is the internal ground that is provided in housing 30 and that is common to first control circuit 32*a* and second control circuit 32*b*.

By connecting first control circuit 32*a* and second control circuit 32*b* to common ground 49, the potential difference between the ground of first control circuit 32*a* and the ground of second control circuit 32*b* can be suppressed from occurring, and incorrectly detecting the abnormality of the ground can be prevented.

The ground terminal of first inverter 31*a* is connected to ground line 40*a*, and a first shunt resistor 39*a* for detecting the current flowing through first winding set 13*a* of electric motor 13 is provided between ground line 40*a* and first inverter 31*a*.

Furthermore, a rectifying control element 47*a* which is constituted by connecting the first rectifying element in parallel with the first switch element is provided between common ground 49 and the point on ground line 40*a* to which one end of first shunt resistor 39*a* is connected.

Rectifying control element 47*a* is, for example, constituted by an N-channel MOSFET 47*a*2 with a parasitic diode 47*a*1.

Here, parasitic diode 47*a*1 has its cathode connected to first ground connector 34*a* and its anode connected to common ground 49. That is, parasitic diode 47*a*1 of N-channel MOSFET 47*a*2 functions as the rectifying element that passes the current from common ground 49 to first ground connector 34*a* and cuts off the current that is directed to common ground 49.

Furthermore, N-channel MOSFET 47*a*2 functions as the switch element that is connected in parallel with the rectifying element, and the current can flow toward common ground 49 during the ON state of N-channel MOSFET 47*a*2.

The gate of N-channel MOSFET 47*a*2 that constitutes rectifying control element 47*a* is connected to a digital output terminal DO of first microcomputer 42*a*, and first microcomputer 42*a* uses the control signal that is output from digital output terminal DO to switch N-channel MOSFET 47*a*2 on and off.

Furthermore, a resistor R1*a* as the third current detection element is provided between rectifying control element 47*a* and common ground 49, and a capacitor C1*a* is provided in parallel with resistor R1*a* and rectifying control element 47*a*.

The arrangement of resistor R1*a* and rectifying control element 47*a* can be swapped, and rectifying control element 47*a* can be arranged between resistor R1*a* and common ground 49.

The power supply circuit of the second drive control system has the same configuration as that of the first drive control system.

That is, second power supply connector 33b is connected to second control circuit 32b via a power supply line 37b in housing 30.

Furthermore, the power supply terminal of second inverter 31b is connected to power supply line 37b, and a power supply relay 38b which is the sixth switch element for controlling supplying and cutting off power from second battery 17b to second inverter 31b is provided between power supply line 37b and second inverter 31b.

Power supply relay 38b is composed of an N-channel MOSFET, for example, and second microcomputer 42b outputs the control signal to switch power supply relay 38b on and off.

The parasitic diode of the N-channel MOSFET that constitutes power supply relay 38b has its cathode connected to power supply line 37b and its anode connected to second inverter 31b.

Second ground connector 34b is connected to common ground 49 via a ground line 40b.

The ground terminal of second inverter 31b is connected to ground line 40b, and a second shunt resistor 39b for detecting the current flowing through second winding set 13b of electric motor 13 is provided between ground line 40b and second inverter 31b.

Furthermore, a rectifying control element 47b which is constituted by connecting the second rectifying element in parallel with the second switch element is provided between common ground 49 and the point on ground line 40b to which one end of second shunt resistor 39b is connected.

Rectifying control element 47b is, for example, constituted by an N-channel MOSFET 47b2 with a parasitic diode 47b1, and parasitic diode 47b1 has its cathode connected to second ground connector 34b and its anode connected to common ground 49.

That is, parasitic diode 47b1 of N-channel MOSFET 47b2 functions as the rectifying element that passes the current from common ground 49 to second ground connector 34b and cuts off the current that is directed to common ground 49, and N-channel MOSFET 47b2 functions as the switch element that is connected in parallel with the rectifying element.

The gate of N-channel MOSFET 47b2 that constitutes rectifying control element 47b is connected to digital output terminal DO of second microcomputer 42b, and second microcomputer 42b uses the control signal that is output from digital output terminal DO to switch N-channel MOSFET 47b2 on and off.

Furthermore, a resistor R1b is provided between rectifying control element 47b and common ground 49, and a capacitor C1b is provided in parallel with resistor R1b and rectifying control element 47b.

The arrangement of resistor R1b and rectifying control element 47b can be swapped, and rectifying control element 47b can be arranged between resistor R1b and common ground 49.

Next, the configurations of first control circuit 32a and second control circuit 32b will be described.

First control circuit 32a functions to control first inverter 31a in the first drive control system, and includes first microcomputer 42a, first drive circuit 43a, first power supply circuit 44a, a first current detecting circuit 45a, a first diode Da and the like.

Second control circuit 32b functions to control second inverter 31b in the second drive control system, and includes second microcomputer 42b, second drive circuit 43b, second power supply circuit 44b, a second current detecting circuit 45b, a second diode Db and the like.

First microcomputer 42a and second microcomputer 42b are connected by an intra-board communication line so that information can be sent and received between them. For example, various kinds of abnormality information, information on inverter control and the like in one system is sent to the other system.

Drive circuits 43a and 43b output signals for driving the switch elements of inverters 31a and 31b based on commands from microcomputers 42a and 42b.

Power is supplied from first battery 17a to first power supply circuit 44a via first diode Da.

First power supply circuit 44a is activated when the activation signal is input, for example, by turning on a vehicle ignition switch 51a (i.e., the engine switch or power switch). First power supply circuit 44a converts the input power supply voltage from first battery 17a (for example, input power supply voltage=12V) into a first internal power supply voltage Va (for example, first internal power supply voltage Va=5V), and supplies first internal power supply voltage Va to first microcomputer 42a, first drive circuit 43a, and first current detecting circuit 45a, respectively.

Power is supplied from second battery 17b to second power supply circuit 44b via second diode Db.

Second power supply circuit 44b is activated when the activation signal is input, for example, by turning on a vehicle ignition switch 51b. Second power supply circuit 44b converts the input power supply voltage from second battery 17b (for example, input power supply voltage=12V) into a second internal power supply voltage Vb (for example, second internal power supply voltage Vb=5V), and supplies second internal power supply voltage Vb to second microcomputer 42b, second drive circuit 43b, and second current detecting circuit 45b, respectively.

Ignition switches 51a and 51b operate in conjunction with each other, and first power supply circuit 44a and second power supply circuit 44b are activated at the same time.

First current detecting circuit 45a is the resistance voltage-dividing circuit that is constituted by an NPN transistor Tra and resistors R2a and R3a.

The collector of NPN transistor Tra is connected to first power supply circuit 44a as the positive power supply via resistor R2a, and first current detecting circuit 45a uses first internal power supply voltage Va as the power supply voltage.

The emitter of NPN transistor Tra is connected between first ground connector 34a and the series circuit of resistor R1a and rectifying control element 47a via a resistor R3a.

Furthermore, an analog input terminal AD of first microcomputer 42a is connected to the connection point between the emitter of NPN transistor Tra and resistor R3a, and first microcomputer 42a acquires information of the voltage (i.e., the potential difference) applied to resistor R3a by A/D conversion.

Furthermore, the base of NPN transistor Tra is connected to digital output terminal DO of first microcomputer 42a, and first microcomputer 42a uses the control signal that is output from digital output terminal DO to switch NPN transistor Tra on and off.

Regarding the resistance values of resistors R1a, R2a and R3a, for example, resistor R2a has the resistance value of 10 kΩ, resistor R3a has the resistance value of 10 kΩ which has the same value as resistor R2a, and resistor R1a has the resistance value of 0.1Ω.

Similarly, second current detecting circuit 45b is the resistance voltage-dividing circuit that is constituted by an NPN transistor Trb and resistors R2b and R3b.

The collector of NPN transistor Trb is connected to second power supply circuit 44b as the positive power supply via resistor R2b, and second current detecting circuit 45b uses second internal power supply voltage Vb as the power supply voltage.

The emitter of NPN transistor Trb is connected between second ground connector 34b and the series circuit of resistor R1b and rectifying control element 47b via resistor R3b. Furthermore, an analog input terminal AD of second microcomputer 42b is connected to the connection point between the emitter of NPN transistor Trb and resistor R3b, and second microcomputer 42b acquires information of the voltage (i.e., the potential difference) applied to resistor R3b by A/D conversion.

Furthermore, the base of NPN transistor Trb is connected to digital output terminal DO of second microcomputer 42b, and second microcomputer 42b uses the control signal that is output from digital output terminal DO to switch NPN transistor Trb on and off.

Regarding the resistance values of resistors R1b, R2b and R3b, for example, resistor R2b has the resistance value of 10 kΩ, resistor R3b has the resistance value of 10 kΩ which has the same as resistor R2b, and resistor R1b has the resistance value of 0.1Ω.

As described below, first microcomputer 42a diagnoses the abnormality of first ground connector 34a, that is, whether an open fault has occurred, based on the current (i.e., resistance voltage division) that is detected by using first current detecting circuit 45a. Similarly, second microcomputer 42b diagnoses the abnormality of second ground connector 34b, that is, whether an open fault has occurred, based on the current (i.e., resistance voltage division) that is detected by using second current detecting circuit 45b.

The open fault of ground connectors 34a and 34b is the abnormality where the current is cut off between the negative terminals of batteries 17a and 17b and EPS control unit 14 since ground harnesses 36a and 36b for connecting ground connectors 34a and 34b and the negative terminals of batteries 17a and 17b are removed or disconnected.

Figure 3:
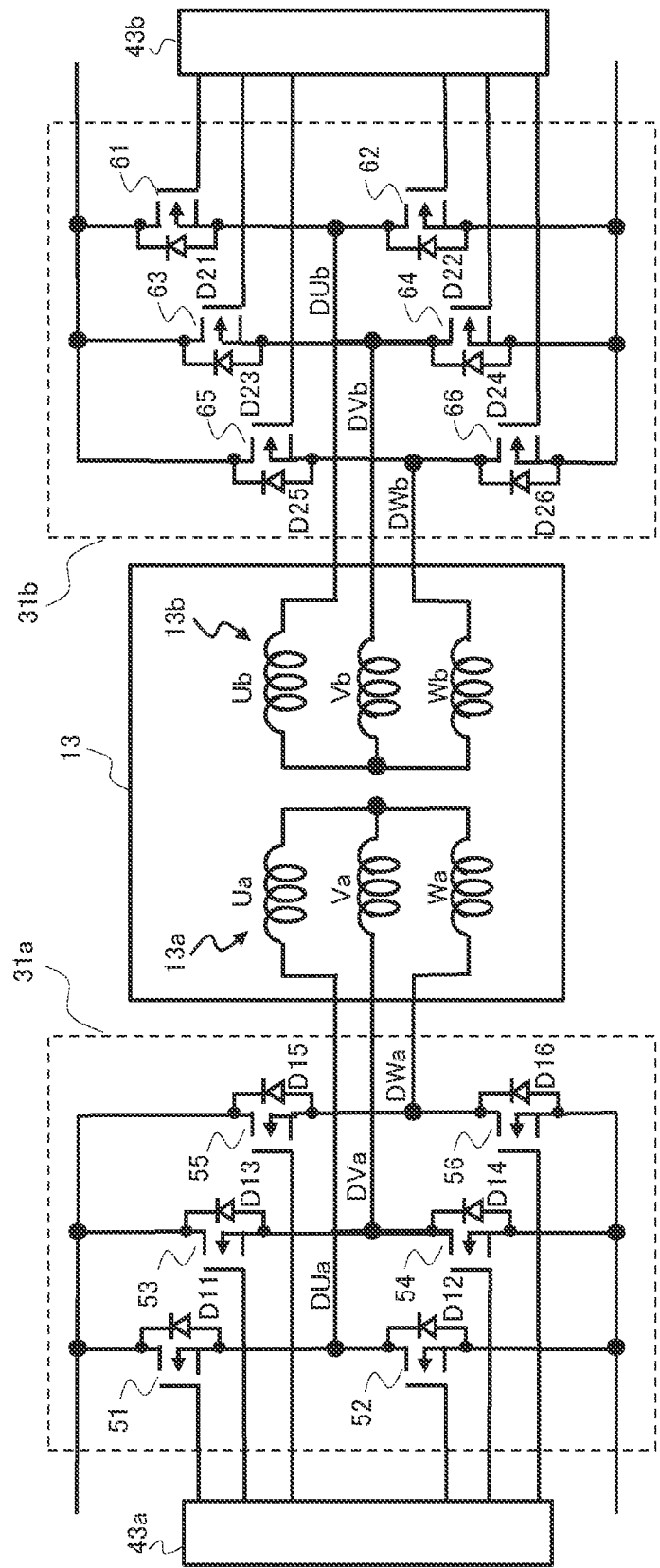
FIG. 3 is a circuit diagram illustrating in detail a first inverter, a second inverter, and winding sets of the electric motor in the drive controller.

FIG. 3 is a circuit diagram illustrating in detail the configurations of first inverter 31a, second inverter 31b, and electric motor 13 that are illustrated in FIG. 2.

Electric motor 13 includes a first winding set 13a of the first system and a second winding set 13b of the second system. First winding set 13a is composed of a U-phase coil Ua, a V-phase coil Va, and W-phase coil Wa. Second winding set 13b is composed of a U-phase coil Ub, a V-phase coil Vb, and a W-phase coil Wb.

First inverter 31a is the three-phase bridge circuit including three sets of switch elements 51-56 that drive coils Ua, Va, and Wa of first winding set 13a via drive lines DUa, DVa, and DWa, respectively, and N-channel MOSFETs are used as switch elements 51-56.

Furthermore, second inverter 31b is the three-phase bridge circuit including three sets of switch elements 61-66 that drive coils Ub, Vb, and Wb of second winding set 13b via drive lines DUb, DVb, and DWb, respectively, and N-channel MOSFETs are used as switch elements 61-66.

MOSFETs 51 and 52 in first inverter 31a have series-connected drain and source between power supply relay 38a and one end of first shunt resistor 39a, and the connection point between MOSFET 51 and MOSFET 52 is connected to one end of drive line DUa.

MOSFETs 53 and 54 have series-connected drain and source between power supply relay 38a and one end of first shunt resistor 39a, and the connection point between MOSFET 53 and MOSFET 54 is connected to one end of drive line DVa.

Furthermore, MOSFETs 55 and 56 have series-connected drain and source between power supply relay 38a and one end of first shunt resistor 39a, and the connection point between MOSFET 55 and MOSFET 56 is connected to one end of drive line DWa.

Here, parasitic diodes D11-D16 are connected in the forward direction between the sources and the drains of MOSFETs 51-56, respectively.

MOSFETs 61 and 62 in second inverter 31b have series-connected drain and source between power supply relay 38b and one end of second shunt resistor 39b, and the connection point between MOSFET 61 and MOSFET 62 is connected to one end of drive line DUb.

MOSFETs 63 and 64 have series-connected drain and source between power supply relay 38b and one end of second shunt resistor 39b, and the connection point between MOSFET 63 and MOSFET 64 is connected to one end of drive line DVb.

Furthermore, MOSFETs 65 and 66 have series-connected drain and source between power supply relay 38b and one end of second shunt resistor 39b, and the connection point between MOSFET 65 and MOSFET 66 is connected to one end of drive line DWb.

Here, parasitic diodes D21-D22 are connected in the forward direction between the sources and the drains of MOSFET 61-66, respectively.

Figure 4:
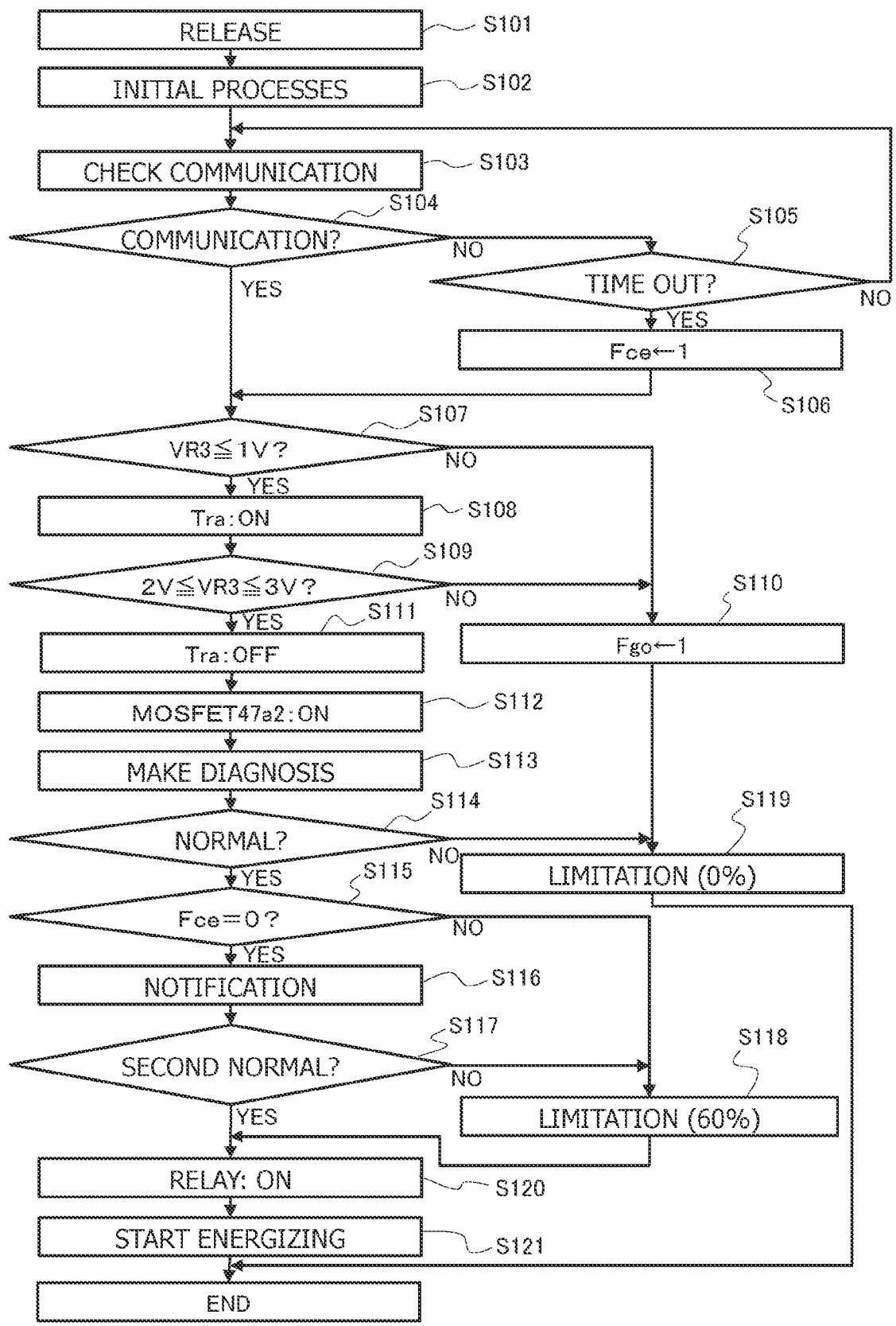
FIG. 4 is a flowchart illustrating the control operation including a diagnostic process of the ground connector.

FIG. 4 is a flowchart illustrating the processing flow of diagnosing the abnormality of first ground connector 34a which is performed by first microcomputer 42a, specifically, the processing flow of diagnosing the open fault of ground connector.

Second microcomputer 42b separately performs the process of diagnosing the abnormality of second ground connector 34b; however, its processing flow of diagnosing the abnormality is the same as the diagnosing process performed by first microcomputer 42a as illustrated in FIG. 4, and thus, is not described in detail herein.

When first microcomputer 42a is released from reset by turning on the power in step S101, various initial processes are performed by first microcomputer 42a in step S102.

After completing the initial processes, first microcomputer 42a proceeds to step S103 and checks the communication state between first microcomputer 42a and second microcomputer 42b.

Then, in step S104, first microcomputer 42a determines whether or not its communication with second microcomputer 42b is normal.

If the communication abnormality exists and the information cannot be sent or received normally between first microcomputer 42a and second microcomputer 42b, first microcomputer 42a proceeds to step S105, and determines whether or not the communication abnormality continues for a predetermined time or longer.

If the duration of communication abnormality has not reached the predetermined time, first microcomputer 42a returns to step S103 and checks the communication state again.

On the other hand, if the duration of communication abnormality between first microcomputer 42a and second microcomputer 42b reaches the predetermined time and the occurrence of communication abnormality is certain, first microcomputer 42a proceeds to step S106, and sets a communication error flag Fce to "1". Communication error flag Fce indicates whether a communication abnormality has occurred between first microcomputer 42a and second microcomputer 42b, and "1" indicates the abnormal communication state.

The initial value of communication abnormality flag Fce is "0" which indicates the normal communication between first microcomputer 42a and second microcomputer 42b.

If first microcomputer 42a determines that its communication with second microcomputer 42b is normal in step S104, first microcomputer 42a proceeds to step S107. First microcomputer 42a also proceeds to step S107 after communication abnormality flag Fce is set to "1" in step S106.

In step S107, first microcomputer 42a determines whether or not the detection value (i.e., the ground open detection signal) of the voltage that is applied to resistor R3a of first current detecting circuit 45a is close to 0V.

Here, when a voltage VR3 applied to resistor R3a is equal to or less than a predetermined voltage (for example, the predetermined voltage=1V), first microcomputer 42a determines that voltage VR3 is close to 0V.

At the time of step S107, the control states of various switch elements are the initial states, and first microcomputer 42a issues an OFF command to NPN transistor Tra, N-channel MOSFET 47a2 of rectifying control element 47a, and power supply relay 38a.

During the OFF state of NPN transistor Tra that is arranged between resistor R3a and the power supply, no current flows through resistor R3a, and voltage VR3 applied to resistor R3a is close to 0V.

Thus, if voltage VR3 applied to resistor R3a is not close to 0V in step S107, first microcomputer 42a determines that the circuit abnormality has occurred, and proceeds to step S110.

Furthermore, when first microcomputer 42a detects that voltage VR3 applied to resistor R3a is close to 0V in step S107, first microcomputer 42a proceeds to step S108, and issues an ON command to NPN transistor Tra.

First microcomputer 42a suppresses the power consumption of first power supply circuit 44a by turning on NPN transistor Tra only when diagnosing the open fault of first ground connector 34a.

Then, first microcomputer 42a issues the command to switch NPN transistor Tra from OFF to ON, and proceeds to step S109 after a predetermined time has elapsed.

The predetermined time in step S108 is the time adapted based on the time required for the semiconductor switch element such as NPN transistor Tra to reach the stable ON or OFF state from the ON or OFF switching command. The same applies to the predetermined time in steps S111, S112 and S120.

In step S109, first microcomputer 42a determines whether or not voltage VR3 applied to resistor R3a is close to 2.5V.

Here, since N-channel MOSFET 47a2 is in the OFF state and the cathode of parasitic diode 47a1 is connected to first ground connector 34a, current is prevented from flowing from resistor R3a to second battery 17b via rectifying control element 47a, common ground 49, rectifying control element 47b, and second ground connector 34b.

Therefore, the ground of first current detecting circuit 45a is limited to the path leading to first battery 17a through first ground connector 34a.

Hence, when the open fault occurs in first ground connector 34a, no current flows into first current detecting circuit 45a even if NPN transistor Tra is turned on, and voltage VR3 applied to resistor R3a becomes close to first internal power supply voltage Va (i.e., a predetermined voltage range) instead of becoming close to 2.5V that is caused by the resistance voltage division.

Thus, first microcomputer 42a determines that the open fault occurs in first ground connector 34a when NPN transistor Tra is turned on and voltage VR3 applied to resistor R3a becomes close to first internal power supply voltage Va instead of becoming close to the set value of 2.5V that is caused by the resistance voltage division.

If voltage VR3 applied to resistor R3a is not close to 2.5V, but is close to first internal power supply voltage Va which is the power supply voltage of first current detecting circuit 45a, first microcomputer 42a determines that the open fault occurs in first ground connector 34a and proceeds to step S110, and sets a ground open abnormality flag Fgo to "1" which indicates the open fault state of first ground connector 34a.

The initial value of ground open abnormality flag Fgo is "0" which indicates that no open fault occurs and first ground connector 34a is normal.

Furthermore, in step S110, first microcomputer 42a sets ground open abnormality flag Fgo to "1", and if the communication between first microcomputer 42a and second microcomputer 42b is normal, sends information indicating that the open fault occurs in first ground connector 34a, that is, information of ground open abnormality flag Fgo=1, to second microcomputer 42b. First microcomputer 42a then performs the process of turning NPN transistor Tra back to the OFF state.

Furthermore, first microcomputer 42a sets ground open abnormality flag Fgo to "1" in step S110, and proceeds to step S119. In step S119, first microcomputer 42a performs the process of setting the current limiting ratio of first inverter 31a to 0% as the process of dealing with the open abnormality of first ground connector 34a, and inhibits driving of first inverter 31a.

The initial value of the current limiting ratio is 100% that does not limit the current of first inverter 31a, and the lesser the value [%] of the current limiting ratio is than 100%, the lower the drive current of electric motor 13 is limited than usual.

When first inverter 31a is driven in the open fault state of first ground connector 34a, the current flowing through first inverter 31a flows into second ground connector 34b via common ground 49, and the current concentrates in second ground connector 34b.

Here, if first inverter 31a is not driven, no current flows from the first system to second ground connector 34b, and thus, the excessive current can be prevented from flowing into second ground connector 34b.

Therefore, first microcomputer 42a can suppress the occurrence of abnormality also in second ground connector 34b when the open fault occurs in first ground connector 34a, and can let the second system continue controlling and driving electric motor 13.

Furthermore, first microcomputer 42a can use first current detecting circuit 45a and rectifying control element 47a to diagnose whether the open fault has occurred in first ground connector 34a before the start of driving first inverter 31a, that is, before the current actually flows into the other system.

When first microcomputer 42a detects the open fault in first ground connector 34a, first microcomputer 42a can let the driver of the vehicle recognize the information regarding the abnormality of electric power steering device 100 by lighting the alarm lamp or the like.

Furthermore, in step S119, first microcomputer 42a can set the current limiting ratio to any value that is more than 0% and less than 100%.

That is, in step S119, first microcomputer 42a performs the process of reducing the current flowing from the first system to second ground connector 34b, i.e., the current flowing through second ground connector 34b in the open fault state of first ground connector 34a. Therefore, the process is not limited to stopping the drive of first inverter 31a, and it is possible to perform the process of reducing the current flowing through first inverter 31a while continuing to drive first inverter 31a.

Furthermore, in step S119, provided that the communication is normal, first microcomputer 42a sends the command signal to second microcomputer 42b to limit the drive current of second inverter 31b lower than usual so that the current can be reduced both in the first and second systems. By doing so, the current flowing through second ground connector 34b can be reduced.

When first microcomputer 42a determines that voltage VR3 applied to resistor R3a is close to 2.5V and first ground connector 34a is normal in step S109, first microcomputer 42a proceeds to step S111.

First microcomputer 42a issues the command to switch NPN transistor Tra from OFF to ON in step S111, and proceeds to step S112 after a predetermined time (for example, 10 ms) has elapsed.

First microcomputer 42a issues the command to switch N-channel MOSFET 47a2 of rectifying control element 47a from OFF to ON in step S112, and proceeds to step S113 after a predetermined time (for example, 10 ms) has elapsed.

In step S113, first microcomputer 42a makes the fault diagnosis of first inverter 31a.

For example, first microcomputer 42a executes control to discharge the electric charge accumulated in the capacitor (not illustrated) that is connected between the power supply line of first inverter 31a and the ground by controlling and driving N-channel type MOSFETs 51-56. At this time, first microcomputer 42a can diagnose whether the fault has occurred in first inverter 31a, that is, N-channel type MOSFETs 51-56, based on the current detected by first shunt resistor 39a.

In the next step S114, first microcomputer 42a determines whether or not the diagnosis result of first inverter 31a in step S113 is normal.

If first inverter 31a is abnormal, first microcomputer 42a proceeds to step S119, sets the current limiting ratio of first inverter 31a to 0%, and inhibits driving of first inverter 31a.

That is, if first inverter 31a is normal, first microcomputer 42a maintains the current limiting ratio of first inverter 31a at the initial value of 100%, controls first inverter 31a as usual, and if first inverter 31a is abnormal, sets the current limiting ratio of first inverter 31a to 0%, and inhibits driving of first inverter 31a.

On the other hand, when first inverter 31a is normal, first microcomputer 42a proceeds from step S114 to step S115, and determines whether or not communication abnormality flag Fce is 0, that is, whether or not the communication between first microcomputer 42a and second microcomputer 42b is normal.

When communication abnormality flag Fce is 0 and the communication between first microcomputer 42a and second microcomputer 42b is normal, first microcomputer 42a proceeds to step S116, and sends information indicating that first ground connector 34a is normal, that is, information of grand open abnormality flag Fgo=0, to second microcomputer 42b.

First microcomputer 42a then proceeds to step S117 to determine whether or not information indicating that second ground connector 34b is normal has been received from second microcomputer 42b.

If second ground connector 34b is normal, first microcomputer 42a, proceeds to step S120 in order to start controlling and driving first inverter 31a, while maintaining the current limiting ratio of first inverter 31a at the initial value of 100%.

On the other hand, if first microcomputer 42a determines that its communication with second microcomputer 42b is abnormal in step S115, first microcomputer 42a proceeds to step S118, and if first microcomputer 42a determines that the open fault occurs in second ground connector 34b of the second system in step S117, first microcomputer 42a proceeds to step S118.

In step S118, first microcomputer 42a sets the current limiting ratio of first inverter 31a to the value that is less than the initial value (for example, 100%) and more than 0%, that is, 60%, for example.

If the communication between first microcomputer 42a and second microcomputer 42b is abnormal, first microcomputer 42a cannot obtain information on the second system from second microcomputer 42b, for example, the diagnostic information such as the open fault in second ground connector 34b, and the information on the torque that is generated in the second system.

Therefore, first microcomputer 42a limits the current of first inverter 31a as the fail-safe process to continue driving first inverter 31a, that is, continue generating the steering assist force by first winding set 13a.

Furthermore, when the open fault occurs in second ground connector 34b, second microcomputer 42b sets the current limiting ratio of second inverter 31b to 0% by following the same procedure as the flowchart of FIG. 4.

In parallel with this process, first microcomputer 42a limits the current of first inverter 31a so that the overcurrent is more reliably prevented from flowing to first ground connector 34a.

First microcomputer 42a issues the command to switch power supply relay 38a from OFF to ON in step S120, and proceeds to step S121 after a predetermined time (for example, 10 ms) has elapsed.

In step S121, first microcomputer 42a starts controlling energization of first inverter 31a, in which turning N-channel type MOSFETs 51-56 of first inverter 31a on and off is PWM-controlled based on the torque command or the like.

After first inverter 31a starts driving, first microcomputer 42a can diagnose from the output of first current detecting circuit 45a whether the open fault has occurred in first ground connector 34a.

During the ON state of N-channel MOSFET 47a2 that constitutes rectifying control element 47a, the current can flow in both directions in rectifying control element 47a.

Here, when first ground connector 34a is normal, the current flowing through first power supply circuit 44a and the like flows from common ground 49 to first ground connector 34a through resistor R1a.

On the other hand, when the open fault occurs in first ground connector 34a, the current flowing through first inverter 31a cannot flow toward first ground connector 34a, but flows to common ground 49 through resistor R1a, and flows from common ground 49 to second ground connector 34b through resistor R1b of the second system.

That is, the current flowing direction in resistor R1a is reversed depending on whether first ground connector 34a is normal or in the open fault condition. Also, resistor R1a has a potential difference 0V when first ground connector 34a is normal, and has a predetermined positive voltage when the open fault occurs in first ground connector 34a.

Therefore, after first inverter 31a starts driving, first microcomputer 42a can determine the potential difference in resistor R1a based on the output of first current detecting circuit 45a, and can diagnose whether first ground connector 34a is normal or in the open fault condition.

Similar to first microcomputer 42a, after second inverter 31b starts driving, second microcomputer 42b can diagnose from the output of second current detecting circuit 45b whether the open fault has occurred in second ground connector 34b.

As described above, according to the present invention, common ground 49 is provided so that the potential difference can be prevented from occurring in the internal grounds of control circuits 32a and 32b in the respective systems.

Furthermore, whether an abnormality has occurred in ground connectors 34a and 34b can be detected with high accuracy before inverters 31a and 31b start driving.

Therefore, when the common internal ground is used in the redundant drive control systems, even if the open fault occurs in one of ground connectors 34a and 34b to be connected to the external grounds, the current can be prevented from concentrating on the other ground connector so that the drive of electric motor 13 can be continuously controlled by the normal system.

The technical ideas described in the embodiment may be used in combination as appropriate, provided that no contradiction occurs.

Furthermore, the present invention is described in detail on the basis of the preferred embodiment, but it is obvious that one skilled in the art can make various modifications within the basic technical ideas and teachings of the present invention.

For example, although rectifying control elements 47a and 47b are required to be the elements that can energize ground connectors 34a and 34b from common ground 49 and can cut off the current in the opposite direction, the elements may be constituted by the diodes where the cathodes are connected to ground connectors 34a and 34b, and the switch elements may be omitted.

Furthermore, instead of constituting rectifying control elements 47a and 47b by the MOSFETs having the parasitic diodes, rectifying control elements 47a and 47b may be constituted by the parallel connection circuit of the diode and the switch element.

Furthermore, NPN transistors Tra and Trb as the switch elements of current detecting circuits 45a and 45b can be omitted, and the switch elements are not limited to the NPN transistors.

Furthermore, power supply relays 38a and 38b can be omitted. Furthermore, power supply relays 38a and 38b are not limited to the MOSFETs, and moreover, the installation direction of drain and source in each MOSFET is not limited to the direction that is illustrated in FIG. 1.

Furthermore, resistors R1a and R1b may be omitted, and resistors R1a and R1b may be arranged upstream or downstream of rectifying control elements 47a and 47b.

Furthermore, capacitors C1a and C1b that are connected in parallel with rectifying control elements 47a and 47b may be omitted.

Furthermore, the power supply voltage of current detecting circuits 45a and 45b is not limited to 5V but may be set to any voltage.

REFERENCE SYMBOL LIST

100 Electric power steering device
13 Electric motor
13a First winding set
13b Second winding set
14 EPS control unit (drive controller)
17a, 17b Battery
31a First inverter
31b Second inverter
32a First control circuit
32b Second control circuit
33a First power supply connector
33b Second power supply connector
34a First ground connector
34b Second ground connector
38a, 38b Power supply relay (fifth and sixth switch elements)
42a First microcomputer
42b Second microcomputer
45a First current detecting circuit
47a, 47b Rectifying control element
47a1, 47b1 Parasitic diode (first and second rectifying elements)
47a2, 47b2 N-channel MOSFET (first and second switch elements)
49 Common ground
Tra, Trb NPN transistor (third and fourth switch elements)
R1a, R1b Resistor (third and fourth current detection elements)
R2a, R2b Resistor (first and second current detection elements)
R3a, R3b Resistor

The invention claimed is:

1. A drive controller for use in an electric motor that includes a first winding set and a second winding set, the drive controller comprising:
    a first system that controls and drives the first winding set, the first system including a first control circuit, a first inverter, a first power supply connector, and a first ground connector; and
    a second system that controls and drives the second winding set, the second system including a second control circuit, a second inverter, a second power supply connector, and a second ground connector,
    wherein the first control circuit and the second control circuit are connected to an internal common ground,
    a first rectifying element that passes a current from the common ground to the first ground connector is provided in a line that connects the first ground connector and the common ground,
    a second rectifying element that passes a current from the common ground to the second ground connector is provided in a line that connects the second ground connector and the common ground,
    a first current detection element is provided in a line that connects a positive power supply and a line between the first rectifying element and the first ground connector, and
    a second current detection element is provided in a line that connects a positive power supply and a line between the second rectifying element and the second ground connector.

2. The drive controller for the electric motor according to claim 1, wherein the first control circuit has a first microcomputer,
    the first microcomputer detects a voltage that is applied to the first current detection element, and performs a process of dealing with an open abnormality of the first ground connector when the detected voltage is in a predetermined voltage range, the second control circuit has a second microcomputer, and the second microcomputer detects a voltage that is applied to the second current detection element, and performs a process of dealing with an open abnormality of the second ground connector when the detected voltage is in a predetermined voltage range.

3. The drive controller for the electric motor according to claim 2, wherein a first switch element is provided in parallel with the first rectifying element, and a second switch element is provided in parallel with the second rectifying element.

4. The drive controller for the electric motor according to claim 3, wherein a third current detection element is provided in series with the first switch element, and a fourth current detection element is provided in series with the second switch element.

5. The drive controller for the electric motor according to claim 4, wherein the first microcomputer turns off the first switch element before starting to energize the first inverter and turns on the first switch element when starting to energize the first inverter, and the second microcomputer turns off the second switch element before starting to energize the second inverter and turns on the second switch element when starting to energize the second inverter.

6. The drive controller for the electric motor according to claim 1, wherein a third switch element is provided in series with the first current detection element, and a fourth switch element is provided in series with the second current detection element.

7. The drive controller for the electric motor according to claim 1, wherein a fifth switch element is provided between the first inverter and the first power supply connector, and a sixth switch element is provided between the second inverter and the second power supply connector.

* * * * *